United States Patent [19]

Hatano et al.

[11] Patent Number: 4,747,680
[45] Date of Patent: May 31, 1988

[54] SPECTACLE FRAME

[75] Inventors: Tatsuro Hatano, Fujisawa; Kazuyuki Sakamoto, Kawasaki, both of Japan

[73] Assignee: Nippon Kogaku K. K., Tokyo, Japan

[21] Appl. No.: 740,529

[22] Filed: Jun. 3, 1985

[30] Foreign Application Priority Data

Jun. 13, 1984 [JP] Japan ................................ 59-87700

[51] Int. Cl.⁴ ........................... G02C 1/08; G02C 5/22
[52] U.S. Cl. ...................................... 351/90; 351/121; 351/153; 16/228
[58] Field of Search ................................ 351/90-102, 351/153, 121; 16/228

[56] References Cited

U.S. PATENT DOCUMENTS

| | | | |
|---|---|---|---|
| 1,613,765 | 1/1927 | Nerney | 351/99 |
| 1,718,986 | 7/1929 | Searles | 351/153 |
| 4,243,305 | 1/1981 | Elder | 351/153 X |

FOREIGN PATENT DOCUMENTS 670137  4/1952  United Kingdom ................ 351/153

Primary Examiner—Rodney B. Bovernick
Attorney, Agent, or Firm—Shapiro and Shapiro

[57] ABSTRACT

A spectacle frame comprises a pair of plastic rim members suitable for containing individual lenses therein and formed in an open ring-like shape, each of the rim members having at the ends of the open ring thereof a pair of coupling portions in which the rim members are closed by the coupling portions being coupled to each other, a pair of temple members, and fastening means provided to fasten the coupling portions to each of the rim members. The fastening means includes a metal member having one end provided with an internal thread and the other end provided with a hinge piece coupled to one of the pair of temple members, a portion of the metal member including the one end being embedded in one of the coupling portions, and a male screw threadably engaged with the internal thread through the other of the coupling portions.

8 Claims, 2 Drawing Sheets

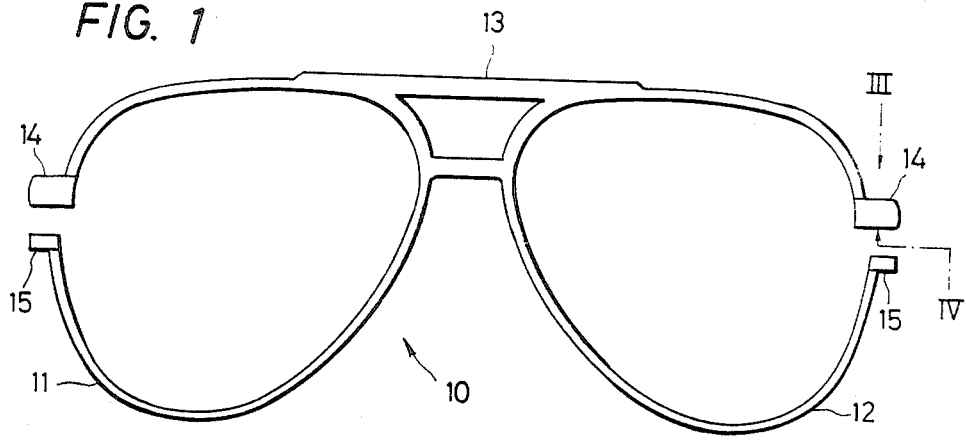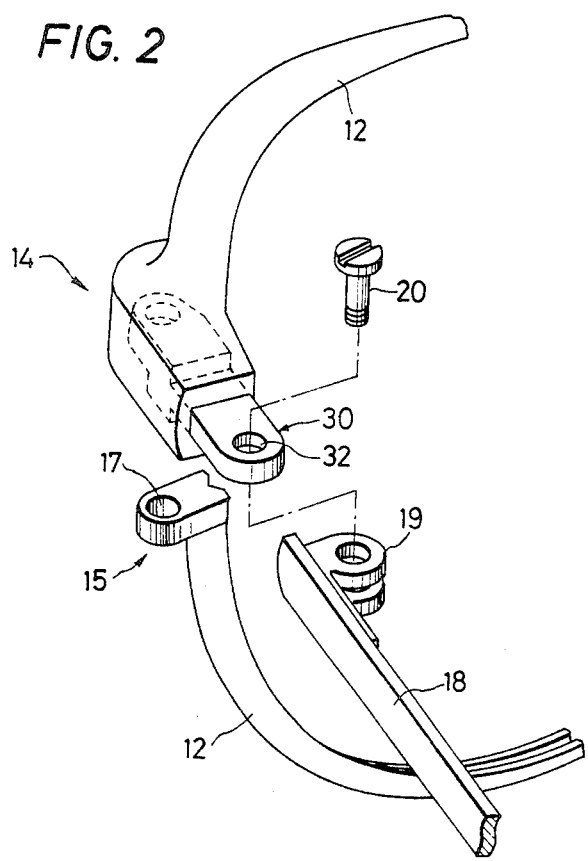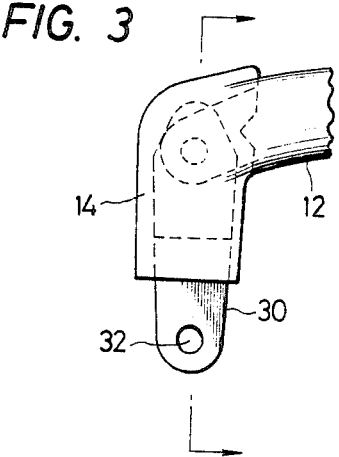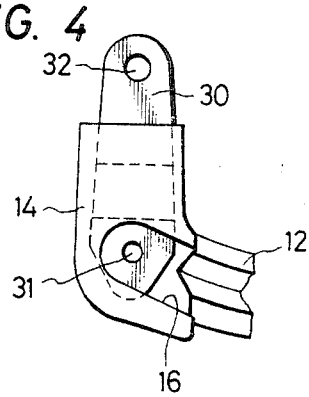

SPECTACLE FRAME

BACKGROUND OF THE INVENTION

1. Field of the Invention

This invention relates to a spectacle frame, and in particular to a plastic spectacle frame.

2. Description of the Prior Art

Spectacle frames provided with a plastic lens bow have been gaining public favor for their light weight and diversity of design. The conventional plastic lens bow is formed in a closed ring-like shape, and when lenses are to be mounted thereon, the diameter of the rims thereof is expanded by heating the lens bow and after the lenses have been mounted thereon, the lens bow is cooled to contract the rims to their original diameter.

Now, plastics are weaker in strength than metals and therefore, it is necessary to make the lens bow thick, and this leads to a disadvantage that the lens bow formed of plastic narrows the field of view and is inferior in appearance. For this reason, investigation of plastic materials having great strength has progressed and recently, frames having a lens bow using plastics reinforced by carbon fibers have become commercially available. In the case of this lens bow, the plastics reinforced by carbon fibers are tough even if they are thin, but they hardly expand when heated and accordingly do not permit the conventional lens mounting method to be adopted. So, each rim of the lens bow has been formed as a substantially C-shaped open ring and a pair of integrally formed coupling portions have been provided at the ends of the open ring, and the two coupling portions have been fastened together by a metallic self-tapping screw to thereby close the bow and hold lenses between the coupling portions.

However, the use of the self-tapping screw may destroy the threads during the mounting or interchange of lenses because the internal thread is formed in the plastic coupling portion. Particularly, Nylon material reinforced by carbon fibers softens in its moisture absorbing state and therefore, the threads are easily destroyed.

On the other hand, metallic hinges are used as hinges for coupling the lens bow to temples. Because a great force is applied to the hinges, the plastic coupling surface is liable to be worn away by frequent opening and closing of the hinges. Moreover, it is desired to adjust the angle of inclination of the temples by bending the hinges. In that case, the hinges are partially mounted on one of the plastic coupling portions by insert molding.

SUMMARY OF THE INVENTION

It is an object of the present invention to provide an improved spectacle frame provided with a plastic lens bow.

The spectacle frame according to the present invention includes a lens bow having a pair of plastic open ring-like rims, and a pair of coupling portions are formed integrally with each rim at the ends of the open ring of each rim, and each rim is closed by the mutual coupling of the pair of coupling portions by a fastening device. The fastening device includes a male screw member passed through a through-hole formed in one of the coupling portions of each pair, and a metal member having one end formed with an internal (female) thread fit to the male screw member and the other end formed with a hinge piece coupled to the hinge piece of the temple of the spectacle frame, the metal member being provided integrally with the other of the coupling portions of each pair. One end of the metal member is embedded in the other coupling portion so that the internal thread is exposed at a location opposed to one coupling portion, and the hinge piece at the other end of the metal member is projected outwardly of the coupling portion. Thus, there are obtained coupling portions in which a metallic female thread is inserted, and destruction of the thread is prevented.

BRIEF DESCRIPTION OF THE DRAWINGS

FIG. 1 is a front view showing a lens bow according to an embodiment of the present invention.

FIG. 2 is a perspective view showing the coupling portions of one of the rims of the lens bow of FIG. 1.

FIG. 3 is an enlarged plan view taken along arrow III of FIG. 1.

FIG. 4 is an enlarged bottom view taken along arrow IV of FIG. 1.

DESCRIPTION OF THE PREFERRED EMBODIMENT

Figure 5:
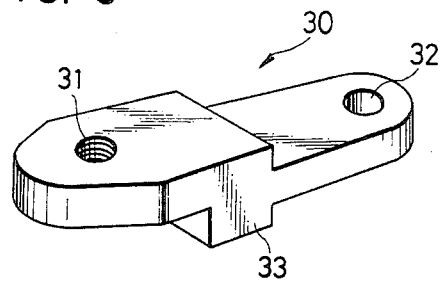
FIG. 5 is a perspective view showing a metal member.

Referring to FIG. 1, a lens bow 10 includes a pair of rim members 11 and 12 formed of Nylon reinforced by carbon fibers and coupled together by a bar 13. Each of the rim members 11 and 12 is formed into an open ring-like shape, and a pair of coupling portions 14 and 15 are provided at the ends of each open ring portion. The coupling portions are formed integrally with the lens bow 10. The upper coupling portion 14 is made larger than the lower coupling portion 15, and a metal member 30 is embedded in the upper coupling portion 14 as shown in FIG. 2. As shown in FIG. 4, a depression 16 of suitable shape and size for fitting the coupling portion 15 thereinto is formed in the coupling portion 14 at a location opposed to the coupling portion 15. The coupling portion 15 has a through-hole 17 for passing a fastening male screw therethrough.

The metal member 30 is formed of a metal material such as stainless steel or nickel alloy excellent in corrosion resistance and wear proof and, as shown in FIG. 5, it has one substantially flat end provided with an internal thread 31 and another substantially flat end provided with a through-hole 32, and has a flange or step portion 33 formed on the central portion thereof. The one end and flange portion of the metal member 30 are embedded in the coupling portion 14. This embedding may be integrally accomplished in the process of molding of the coupling portion. The metal member 30 is positioned relative to the coupling portion 14 so that the internal thread 31 thereof is exposed on the bottom of the depression 16, and the other end thereof having the through-hole 32 protrudes out of the coupling portion 14. The protruding end of the metal member is combined with a hinge piece 19 fixed to a temple 18 and a screw 20 to thereby constitute a hinge. The flange portion 33 is useful to make the coupling between the metal member 30 and the coupling portion 14 complete and increase the strength of the spectacle frame.

Figure 6:
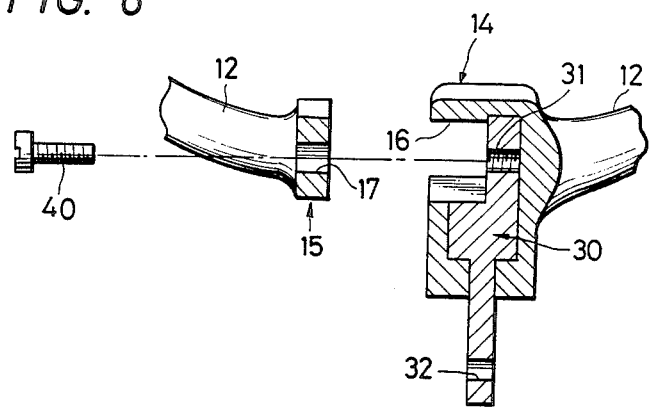
FIG. 6 is a cross-sectional view taken along the arrows of FIG. 3 and showing a fastening device including a screw in its precoupling state.
Figure 7:
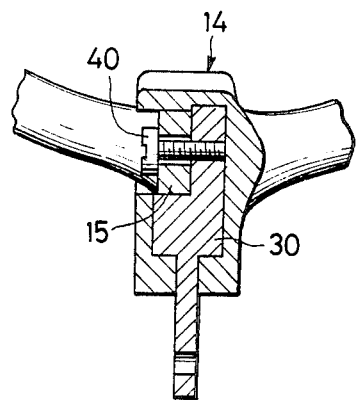
FIG. 7 is a cross-sectional view showing the coupled state of the fastening device of FIG. 6.

The mounting of lenses onto the lens bow 10 may be accomplished by the following procedure. A lens polished in conformity with the shape of the frame is fitted to the inner periphery of the rim member, whereafter the lower coupling portion 15 is fitted into the depression 16 of the upper coupling portion. At this time, the through-hole 17 is opposed to the internal thread 31 of the metal member 30 and, by this fitting, the movement of the coupling portion 15 in the depression 16 is controlled only in the direction of fitting. By passing a male screw 40 into the through-hole 17 and bringing it into threadable engagement with the internal thread 31 as shown in FIG. 6, the coupling portion 15 is completely fixed within the depression 16, whereby the coupling portions 14 and 15 become integral with each other and the rim member 12 is closed. This state is shown in FIG. 7.

In the above-described embodiment, the construction of the upper and lower coupling portions may be reversed and the metal member 30 may be insert-molded in the lower coupling portion.

We claim:

1. A spectacle frame comprising:
   a pair of molded plastic rim members suitable for containing individual lenses therein and having an open ring-like shape, each of said rim members having at the ends of the open ring thereof a pair of coupling portions, respectively, one coupling portion of each pair of coupling portions having a depression into which the other coupling portion of each pair of coupling portions is fitted, each of said rim members being closed by the coupling of the respective coupling portions to each other;
   a pair of temple members each having a body portion and having a hinge piece at an end of said body portion; and
   fastening means for fastening the coupling portions of each pair of coupling portions to each other and for connecting said one coupling portion to the body portion of one of said temple members;
   said fastening means including a metal member having one end provided with an internal thread and another end provided with a hinge piece adapted to be coupled to the hinge piece of said one temple member, and a screw member threadably engaged with said internal thread through said other coupling portion;
   said one end of said metal member being integrally molded into said one coupling portion so as to be fixedly embedded therein, and said other end of said metal member projecting from said one coupling portion;
   said one end of said metal member having a surface which is exposed at a bottom of said depression and which includes an entrance to said internal thread.

2. A spectacle frame according to claim 1, wherein said other coupling portion has a through-hole through which said screw member passes.

3. A spectacle frame according to claim 1, wherein said metal member has a flange portion between said one end and said other end, said flange portion being embedded in said one coupling portion.

4. A spectacle frame according to claim 1, wherein said metal member comprises a piece of metal having substantially flat portions at said one end and said other end, respectively, and a step portion between said flat portions, said flat portion at said one end and said step portion being embedded in said one coupling portion.

5. A spectacle frame according to claim 4, wherein said step portion has a thickness larger than the thickness of said flat portions.

6. A spectacle frame according to claim 1, wherein said other coupling portion is in contact with said surface of said metal member when said screw member is engaged with said internal thread.

7. A spectacle frame comprising:
   a pair of molded plastic rim members reinforced by carbon fibers and suitable for containing individual lenses therein and having an open ring-like shape, each of said rim members having at the ends of the open ring thereof a pair of coupling portions, respectively, one coupling portion of each pair of coupling portions having a depression into which the other coupling portion of each pair of coupling portions is fitted, each of said rim members being closed by the coupling of the respective coupling portions to each other;
   a pair of temple members each having a body portion and having a hinge piece at an end of said body portion; and
   fastening means for fastening the coupling portions of each pair of coupling portions to each other and for connecting said one coupling portion to the body portion of one of said temple members;
   said fastening means including a metal member having one end provided with an internal thread and another end provided with a hinge piece adapted to be coupled to the hinge piece of said one temple member, and a screw member threadably engaged with said internal thread through the other coupling portion of each pair of coupling portions;
   said one end of said metal member being integrally molded into said one coupling portion so as to be fixedly embedded therein, and said other end of said metal member projecting from said one coupling portion;
   said one end of said metal member having a surface which is exposed at a bottom of said depression and which includes an entrance to said internal thread.

8. A spectacle frame according to claim 7, wherein said other coupling portion is in contact with said surface of said metal member when said screw member is engaged with said internal thread.

* * * * *